Figure 1:
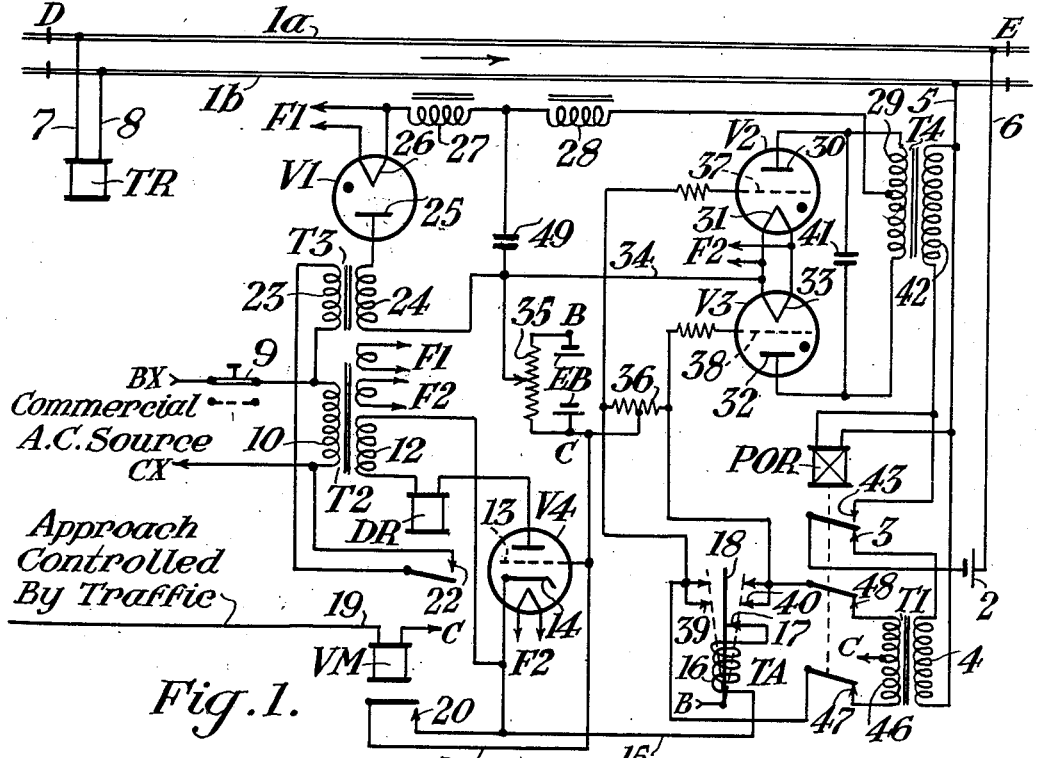

March 21, 1950  C. VOLZ  2,501,590

TRACK CIRCUIT APPARATUS USING ALTERNATING CURRENT

Filed Sept. 7, 1945  2 Sheets-Sheet 1

INVENTOR
Carl Volz.
BY A. L. Vencill
HIS ATTORNEY

Patented Mar. 21, 1950

2,501,590

UNITED STATES PATENT OFFICE 2,501,590

TRACK CIRCUIT APPARATUS USING ALTERNATING CURRENT

Carl Volz, Pittsburgh, Pa., assignor to The Union Switch & Signal Company, Swissvale, Pa., a corporation of Pennsylvania Application September 7, 1945, Serial No. 614,921

4 Claims. (Cl. 246—34)

My invention relates to track circuit apparatus, and more particularly to track circuit apparatus which uses alternating current.

The present application is a continuation-in-part of my copending application for Letters Patent of the United States, Serial No. 549,162, filed August 12, 1944, for Track circuit apparatus, insofar as the subject matter common to the two is concerned. The copending application has become abandoned.

Alternating current of a special frequency is often provided for track circuits to avoid interference from propulsion current and from commercial power stations, the alternating current being used for control of cab signals. Such special frequency current is frequently obtained through a converter means located one at each of the different track circuit locations and energized from a local battery or from a commercial source of alternating current. Such converter means generally includes a tuned alternator. Wear and burning of the contacts of such tuned alternator may be serious, due to the magnitude of the current that is interrupted at the contacts and to avoid failure of apparatus careful maintenance and frequent renewals are required. Furthermore, economy is effected if a single converter can be used to supply current to two or more track circuits.

Accordingly, a feature of my invention is the provision of novel and improved track circuit apparatus.

Another feature of my invention is the provision of track circuit apparatus incorporating novel means to convert direct current or alternating current of a commercial frequency into current of a special frequency for track circuits.

Again, a feature of my invention is the provision of track circuit apparatus incorporating novel means to utilize a vibrating contact member of a tuned alternator to recurrently control a vacuum tube and which tube is included in means for converting alternating current of a commercial frequency into an alternating current of a frequency preselected according to the frequency of the tuned alternator.

Another feature of my invention is the provision of track circuit apparatus incorporating novel means to superimpose alternating current of a special frequency upon direct current, such special frequency current being used for control of cab signals.

I accomplish the features, objects and advantages of my invention by utilizing the vibrating contacts of a tuned alternator to control the operation of a vacuum tube. In certain forms of the invention the tuned alternator monitors the firing of a gas tube, the tube being recurrently fired so that pulses of current flow in the anode circuit. In another form of the invention, a high vacuum tube is used and the alternator varies the voltage applied to the control electrode to correspondingly vary the flow of anode current. Preferably two tubes are provided and the two tubes are alternately fired in the case gas tubes are used and the control electrode voltages are alternately varied in the case high vacuum tubes are used. In either case the anode current is fed through a primary winding of a transformer to induce in a secondary winding of the transformer an alternating voltage of a frequency corresponding to the rate at which the tuned alternator operates. This secondary winding is in turn connected or coupled to the track circuit of a track section to supply an alternating current of the corresponding frequency to the track rails, such alternating current being available to govern cab signals of a train occupying the track section. In this way the contacts of the tuned alternator are required to interrupt only the extremely small energy required to trigger the gas tube or govern the high vacuum tube, and the tube carries the relatively large current required for the track circuit.

Preferably power for the anode circuit and in turn for the track circuit is taken from a commercial source of alternating current through a rectifier. A battery as a stand-by source of power is provided, the battery also being used to energize the tuned alternator. A power-off relay normally switches the track circuit to the tube output circuit for use of the commercial alternating current source but in case of a loss of power at such source the track circuit is switched to use current from the battery.

When gas tubes are used, I provide a delay means for protection of the gas tubes in case a temporary loss of power occurs on the commercial source of alternating current. This delay means comprises a high vacuum tube and a relay controlled thereby, such relay controlling the power applied to the rectifier and gas tubes, the arrangement being such that power is not applied to the anodes of the tubes until their filaments have had sufficient time to fully heat the tubes.

I shall describe three forms of apparatus embodying my invention, and shall then point out the novel features thereof in claims.

Figure 2:
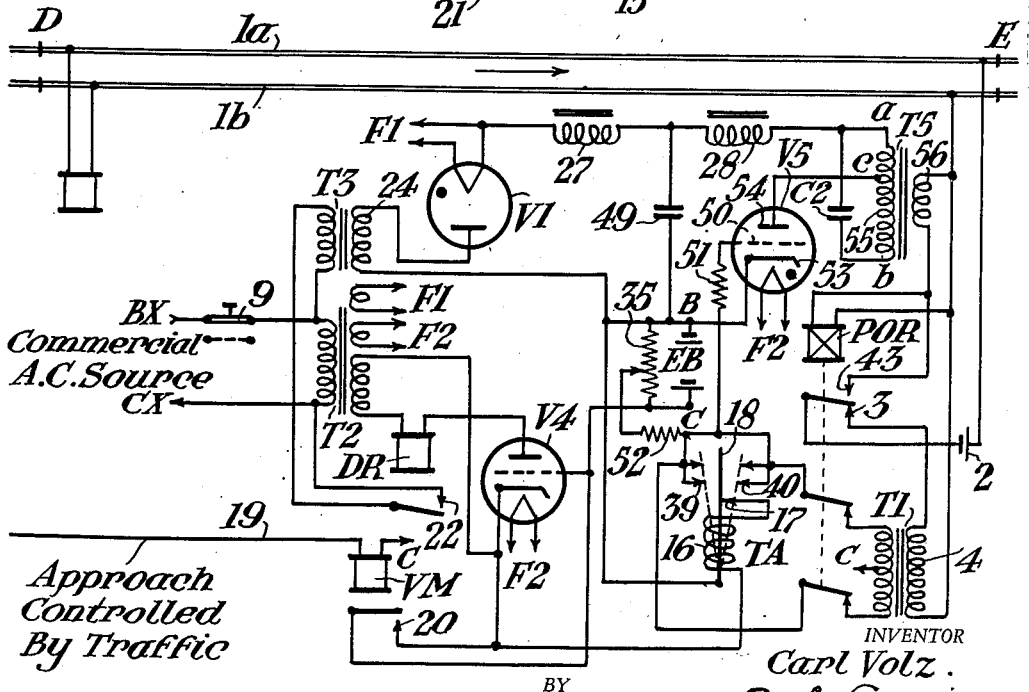
Figure 3:
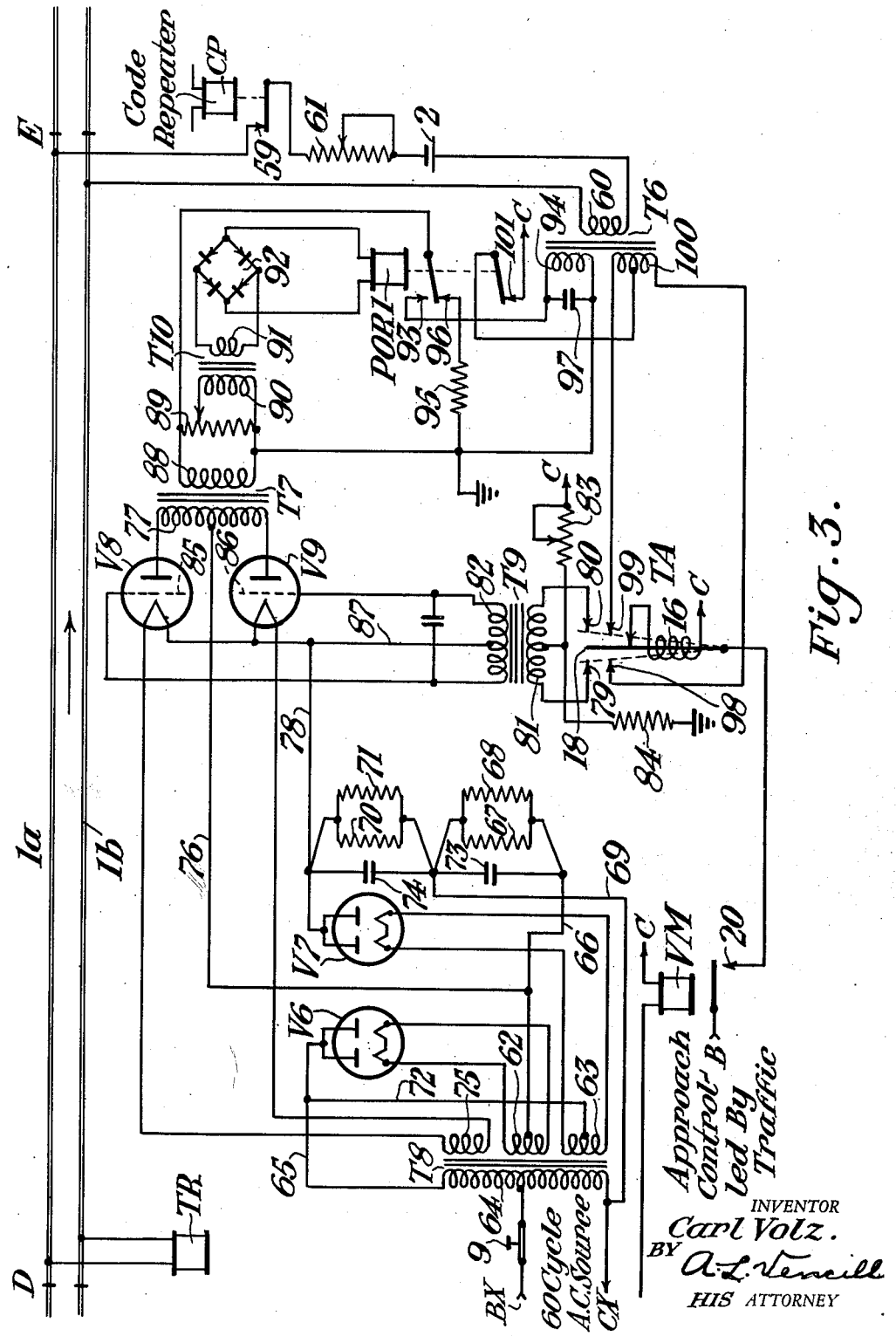

In the accompanying drawings, Fig. 1 is a diagrammatic view showing a preferred form of apparatus embodying my invention when gas tubes are employed and the apparatus is used to superimpose alternating current of a preselected frequency upon a direct current track circuit, such alternating current being suitable for governing cab signals. Fig. 2 is a diagrammatic view showing another form of apparatus embodying my invention when a gas tube is employed and the apparatus is used to superimpose alternating current upon a direct current track circuit. Fig. 3 is a diagrammatic view showing a form of apparatus embodying my invention when high vacuum tubes are employed and the apparatus is used to superimpose alternating current suitable for control of cab signals upon a direct current track circuit. It is to be understood that my invention is not limited to this arrangement of track circuits and such application is used to illustrate the many places where apparatus embodying my invention is useful.

In each of the three views like reference characters are used to designate similar parts.

Referring to Fig. 1, the reference characters 1a and 1b designate the track rails of a stretch of railway over which traffic normally moves in the direction indicated by an arrow, and which rails are formed by the usual insulated rail joints with a track section D—E and which section may be one section of a series of sections of a signal system. Section D—E is provided with a track circuit which includes a battery 2 connected across the rails 1a and 1b at the exit end E of the section through back contact 3 of a relay POR, winding 4 of a transformer T1 and lead wires 5 and 6. Relay POR and transformer T1 will be referred to more fully hereinafter. The track circuit also includes a track relay TR connected across the rails at the entrance end D through lead wires 7 and 8. Track relay TR is thus normally picked up when the section is unoccupied and is released in response to a train occupying the section. The track relay TR is used to control wayside signals and other signal devices but such control and devices are not shown since they form no part of my invention and are not required for a full understanding thereof. In the disclosure of Fig. 1 my invention is primarily directed to apparatus for superimposing on this track circuit for section D—E an alternating current suitable for governing cab signals of a locomotive traversing the section. Such alternating current may be either non-coded or coded according to the type of cab signal system used.

The originating source of power for the alternating current is either a commercial alternating current power line having terminals which are designated BX and CX or a battery EB. Normally, power is derived from the commercial source of alternating current and is converted into alternating current of a special frequency for the track circuit, the battery EB being used to supply only control current and current for operating a tuned alternator to be referred to later. In case of a loss of power for the commercial source of alternating current, then power from the battery EB is converted into alternating current of the special frequency for the track circuit. The commercial source of alternating current may supply a current of a frequency of 60 cycles per second and the track circuit current may be of a frequency of the order of 100 cycles per second. It is to be understood, however, that the invention is not limited to these frequencies and other frequencies may be used.

The apparatus comprises as essential elements a rectifier tube V1, a tuned alternator TA, a converter including gas tubes V2 and V3 and a transformer T4, a power-off relay POR, a delay means including a tube V4 and a relay DR, and a specific arrangement of circuits associated with these several elements.

When a switch 9 is closed, the BX and CX terminals of the commercial source of current are connected to primary winding 10 of a transformer T2, which is provided with independent secondary windings. Two of the secondary windings are connected to filament circuits for the several tubes V1, V2, V3 and V4, the filament circuit for tube V1 being identified conventionally by the reference character F1, and the circuit for tubes V2, V3 and V4 being identified by the reference character F2, as will be readily understood by an inspection of the drawing. Thus the several tubes are all in a normally heated condition. A secondary winding 12 of transformer T2 is connected to the anode circuit of tube V4 of the delay means, a winding of a direct current neutral relay DR being included in this anode circuit. Tube V4 is of the high vacuum type of tube. Control grid 13 of tube V4 is connected to the negative terminal C of battery EB and cathode 14 of tube V4 is connected to positive terminal B of the battery through wire 15 and an operating winding 16, contact 17 and armature 18 of alternator TA. Thus the control grid 13 of tube V4 is negative in potential with respect to cathode 14 by a voltage substantially equal to that of battery EB and the tube is normally biased to substantially zero plate current so that relay DR is normally deenergized.

In Fig. 1 the apparatus is disclosed as being approach controlled through an approach relay VM, which relay is governed by traffic approaching the section D—E in any one of the usual standard arrangements, the approach control including a line circuit having a line wire 19. It is sufficient for this application to point out that relay VM is energized when no train is approaching but that a train entering a track section to the rear of section D—E interrupts the line circuit and relay VM is deenergized. With relay VM deenergized and released to close its back contact 20, control grid 13 and cathode 14 of tube V4 are connected together through wire 21 and back contact 20 and are made of equal potential with the result that plate current flows through tube V4 and relay DR is energized and picked up to close front contact 22. The closing of front contact 22 of relay DR completes a simple circuit by which primary winding 23 of a transformer T3 is connected across the BX—CX source of power and a corresponding alternating voltage is induced in secondary winding 24 of transformer T3.

Secondary winding 24 of transformer T3 serves as the source of power for the anode circuit of the pair of tubes V2 and V3, rectifier tube V1 being included in the anode circuits. Specifically the anode circuits can be traced from the top terminal of winding 24, through anode 25 and tube space to filament 26 of rectifier tube V1, inductances 27 and 28, either top portion of primary winding 29 of transformer T4, anode 30 and tube space to filament 31 of tube V2 to wire 34; or lower portion of primary winding 29, anode 32 and tube space to filament 33 of tube V3 to wire 34; and thence through wire 34 to the lower terminal of secondary winding 24.

Tubes V2 and V3 are triode gas tubes, each having an anode, a cathode and a control grid. Inductances 27 and 28 and a condenser 49 serve to smooth out the rectified current passed by rectifier tube V1. The parts are proportioned for the rectified voltage applied to the anodes of tubes V2 and V3 to be sufficient to fire these tubes except for the fact each one of the tubes V2 and V3 is provided with a negative grid bias voltage which maintains the tube normally nonconductive. The bias voltage for tubes V2 and V3 is obtained from battery EB through resistors 35 and 36. Control grids 37 and 38 of tubes V2 and V3, respectively, are connected to the opposite ends of resistor 36, a mid terminal of which is connected to the negative terminal C of battery EB. Resistor 35 is connected across battery EB and an intermediate terminal of resistor 35 is connected to the filaments of the tubes V2 and V3 through wire 34, and it is clear that each control grid 37 and 38 is negative in potential with respect to the filament of the respective tube by a voltage predetermined by the positioning of the intermediate terminal of resistor 35.

Tuned alternator TA may be of any one of several different well-known constructions for such alternators, and it is sufficient for this application to point out that when the operating winding 16 is energized, the armature 18 is vibrated at a frequency preselected by the proportioning of the parts. Operating winding 16 is energized by battery EB through a contact of the approach relay VM, the arrangements being such that when relay VM is released in response to the approach of a train current flows from terminal B of battery EB through armature 18 and contact 17 of alternator TA, operating winding 16 of the alternator, wire 15, back contact 20 of relay VM and wire 21 to negative terminal C of the battery. Such energization of winding 16 results in armature 18 of the alternator being vibrated at a frequency for which the alternator is constructed. With armature 18 of alternator TA vibrated, it alternately engages contacts 39 and 40, and in so doing causes alternate firing of tubes V2 and V3. When armature 18 swings to the left, as viewed in the drawing, to engage contact 39, current flows from terminal B of battery EB through contact 18—39 of the alternator, left-hand portion of resistor 36 and to terminal C of the battery, thereby creating a voltage drop across this portion of resistor 36. The voltage drop thus created across resistor 36 is applied to the control grid 37 of tube V2 through the grid circuit described hereinbefore to drive the grid in the positive direction and thereby permit the firing of the tube due to the voltage supplied to the anode 30 of the tube in the manner also explained hereinbefore. When armature 18 next swings to the right to engage contact 40, current flows from terminal B of the battery through contact 18—40 of the alternator, right-hand portion of resistor 36 and to terminal C, and a voltage drop is created across the right-hand portion of the resistor. This voltage drop is applied to the control grid 38 of tube V3 through its grid circuit, and tube V3 is fired in response to the voltage applied to its anode 32. A condenser 41 is connected across the anodes 30 and 32 of tubes V2 and V3, and serves to alternately deionize the tubes in the well-known manner. Consequently, the two gas tubes V2 and V3 are alternately fired in step with the vibration of the armature 18 of the tuned alternator TA.

Alternate firing of tubes V2 and V3 causes current impulses to alternately flow in two portions of primary winding 29 of transformer T4, and an alternating voltage is induced in secondary winding 42 of that transformer, the frequency of such voltage being in accordance with the rate at which the tubes are alternately fired and in turn in accordance with the rate of vibration of the tuned alternator TA. For example, the alternating voltage induced in the secondary winding 42 may be of the order of 100 cycles per second. Relay POR is connected across secondary winding 42 and is energized by the alternating voltage induced in this winding in the manner just explained. With relay POR energized and picked up to close front contact 43, the secondary winding 42 of transformer T4 is interposed in the connection of the track battery 2 across the rails, as will be readily understood by an inspection of the drawing. Thus the alternating voltage induced in winding 42 causes an alternating current to flow in the rails of section D—E and such alternating current is available for governing cab signals for any train that is traveling the section, such control of the cab signals being effected in the well-known manner.

Direct current is alternately supplied to primary winding 46 of transformer T1 through contacts 39 and 40 of alternator TA when the power-off relay POR is released. When armature 18 swings to the left to engage contact 39, current flows from terminal B of battery EB through contact 18—39, back contact 47 of relay POR and lower half portion of primary winding 46 of transformer T1 to terminal C. Similarly, when armature 18 swings to the right, current flows from terminal B through contact 18—40 of the alternator, back contact 48 of relay POR and the top half portion of primary winding 46 to terminal C. Current is thus alternately supplied to the two portions of winding 46 and causes an alternating voltage to be induced in secondary winding 4 of the transformer T1, and which alternating voltage is of a frequency corresponding to the frequency of vibration of the tuned alternator. Hence, the frequency of the alternating current induced in secondary winding 4 is substantially the same as that induced in secondary winding 42 of transformer T4 through the alternate firing of tubes V2 and V3. Winding 4 is included in the normal connection of battery 2 to the rails when relay POR is released to close back contact 3, and it follows that when relay POR is released due to a loss of power from the commercial source of alternating current, direct current from battery EB is converted into alternating current through alternator TA and transformer T1 and such alternating current is supplied to the track circuit and is available for governing the cab signals of a train occupying the section.

It is to be seen from the foregoing description of the apparatus of Fig. 1, that when no train approaches the section, the track circuit is supplied from battery 2, each of the tubes V1, V2, V3 and V4 is heated and approach relay VM is picked up. Approach relay VM is released in response to the approach of a train and the tuned alternator TA is immediately set into operation. Assuming power is available from the BX—CX source, the relay DR is energized through tube V4 and power is applied to the anode circuits of tubes V2 and V3 through transformer T3 and rectifier tube V1. Tubes V2 and V3 are alternately fired due to the operation of the alternator and an alternating voltage is created in secondary winding 42 of transformer T4 to energize power-off relay POR and supply alternating current to the track circuit.

In case there is a loss of power in the 60 cycle commercial source no voltage is applied to the tubes V2 and V3, with the result relay POR remains released. Under this condition direct current from battery EB is supplied to winding 46 of transformer T1 through contacts of the tuned alternator and an alternating current is applied to the track circuit from the secondary winding 4 of transformer T1.

In case the alternating current is reapplied to the commercial line after there has been a loss of such power, the delay means serves to protect the gas tubes until their filaments have had time to heat the tube and thereby avoid damage to the cathode by positive ion bombardment. That is, when power from the BX—CX source is reapplied during a period power is being taken from battery EB, the relay DR remains released until the filament of tube V4 is heated and during which period the filaments of tubes V1, V2 and V3 are also being heated. Thus, when relay DR is picked up in response to the heating of tube V4 so that power is applied to transformer T3 and in turn to the anodes of the gas tubes V1, V2 and V3, the filaments of these gas tubes have fully heated the tubes.

In Fig. 2, the apparatus is the same as in Fig. 1 except the pair of tubes V2 and V3 and their associated transformer T4 are replaced by a tube V5 and an associated transformer T5. Tube V5 is a triode gas tube and is provided with a negative grid bias voltage by its control grid 50 being connected to an intermediate terminal of resistor 35 through resistors 51 and 52 in series, and its cathode 53 being connected to positive terminal B of battery EB. This bias voltage maintains tube V5 non-conductive when rectified voltage from transformer T3 is applied to the anode 54 of the tube V5 through the rectifier tube V1.

Normally, that is, when no train is approaching or occupies the track section D—E, the track battery 2 supplies direct current to the track circuit for energizing the track relay TR and current from secondary windings of transformer T2 is applied to the filament circuits F1 and F2 of the different tubes, heating the tubes. With approach relay VM released to close back contact 20 in response to the approach of a train, operating winding 16 of tuned alternator TA is energized to set its armature 18 into vibration. Also relay DR is picked up to apply power to transformer T3 and in turn supply a voltage to the anode circuit of tube V5. When armature 18 of the alternator swings to the right to engage contact 40, control grid 50 of tube V5 is connected to terminal B of battery EB through contact 18—40 and resistor 51, and control grid 50 is driven in the positive direction with the result the tube V5 is fired. When tube V5 is fired, the anode current passing through the portion $a$ to $c$ of primary winding 55 of transformer T5 induces a voltage in the full primary winding 55 for charging a condenser C2 connected across the full winding. The terminal of condenser C2 next to terminal $a$ of primary winding 55 is positive, and the condenser terminal next to terminal $b$ of winding 55 is negative. After the anode current ceases to build up, the condenser C2 then discharges through the transformer winding 55 causing the voltage between terminals $a$ and $c$ to increase making the anode 54 more negative and the tube V5 is deionized. This same action is repeated each time contact 18—40 of the alternator is closed. The anode current impulses thus caused to flow in primary winding 55 of transformer T5 induce an alternating voltage in secondary winding 56 of that transformer. This alternating voltage of secondary winding 56 is applied to relay POR and that relay picks up so that the secondary winding 4 of transformer T1 is disconnected from the connection to the track rails, and secondary winding 56 is interposed in the connection, and an alternating current is supplied to the track circuit and made available for governing a cab signal of any train occupying the section D—E. In case of a failure of the commercial source of alternating current the power-off relay POR remains released and direct current from battery EB is converted into alternating current through the operation of alternator TA and transformer T1, and alternating current from secondary winding 4 of transformer T1 is applied to the rails of the track circuit.

Referring to Fig. 3, the track rails 1a and 1b are formed with a track section D—E which is provided with a track circuit including a track battery 2 and a track relay TR the same as in Fig. 1. In Fig. 3 the battery 2 is connected across the rails through secondary winding 60 of a track transformer T6, a current limiting resistor 61, and contact 59 of a code repeater relay CP, code repeater relay CP being governed by approach controlled means not shown, and operated at times to code the track circuit current. It is clear however that relay CP may be omitted.

Alternating current of a preselected frequency, here assumed as being 100 cycles per second, is at times supplied to the track circuit through track transformer T6 for control of cab signals, such alternating current being derived either from a commercial 60 cycle alternating current source having terminals BX and CX or from a stand-by battery having terminals B and C. The commercial alternating current or the battery current is converted into alternating current of the special 100 cycle through apparatus embodying my invention and which apparatus includes in Fig. 3, a tuned alternator TA and converter means comprising high vacuum tubes V8 and V9, transformer T7 and the track transformer T6.

The commercial alternating current is rectified through tubes V6 and V7 and the rectified current is then converted into the special frequency alternating current through tubes V8 and V9 and transformer T7. The tubes V6 and V7 are alike and as shown each is a voltage doubler rectifier tube having its two sections connected in multiple. The filaments of tubes V6 and V7 are heated from secondary windings 62 and 63, respectively, of a transformer T8, a portion of a primary winding 64 of transformer T8 being connected to terminals BX and CX of the power supply. During the half cycle of the alternating current that the top terminal, as viewed in Fig. 3, of winding 64 is positive, current flows through wire 65, anode to filament space of the two sections of tube V6, the two half portions of winding 62 to its mid terminal, wire 66, capacitor 73 and wire 69 to the lower terminal of winding 64. Such unidirectional current charges capacitor 73 at a voltage corresponding to the proportioning of the parts. Preferably the charge of the capacitor will be of the order of several hundred volts. Resistors 67 and 68 in multiple are connected across capacitor 73 to discharge the capacitor, the resistors being of relatively high value so that they reduce the charge but little under normal conditions but serve to slowly discharge the capacitor when the power is disconnected for inspection and like circumstances.

During the half cycle of the alternating current that the lower terminal of winding 64 is positive, current flows through wire 69, a capacitor 74, anode to filament space of the two sections of tube V7, the two half portions of winding 63 to its mid terminal and wires 72 and 65 to the top terminal of winding 64. This unidirectional current charges capacitor 74 to a relatively high voltage of the order of several hundred volts, the voltage being preferably equal to that built on capacitor 73. Resistors 70 and 71 in multiple are connected across capacitor 74 to slowly discharge the capacitor 74 in the same manner that resistors 67 and 68 serve to discharge capacitor 73 when the power is cut off. Capacitors 73 and 74 are connected in series and it is to be observed that the charges built up on them by the rectified current are additive and the voltage across the two outside terminals of the capacitors is the sum of the two voltages and is of a relatively high order of say, for example, 1000 volts. Also the lower outside terminal of the capacitors is the positive terminal.

The capacitors 73 and 74 serve to supply anode voltage for the tubes V8 and V9 of the converter means. Tubes V8 and V9 may be of any one of several different types and are shown as high vacuum triodes. The filaments of tubes V8 and V9 are heated from a secondary winding 75 of transformer T8 as will be readily understood by an inspection of Fig. 3. The anode circuit of tube V8 extends from the lower outside terminal of capacitor 73 through wire 76 to a mid terminal of primary winding 77 of transformer T7, the upper half portion of winding 77, anode to cathode space of tube V8, and wire 78 to the upper outside terminal of capacitor 74. The anode circuit of tube V9 is same as that for tube V8 to mid terminal of winding 77 and thence through the lower portion of winding 77, anode to cathode space of tube V9 and wire 78 to the upper outside terminal of capacitor 74. This direct voltage created across these capacitors causes a corresponding direct current to flow in the anode circuit of each of the tubes V8 and V9, such direct current flowing in winding 77 of transformer T7.

Tubes V8 and V9 are controlled through tuned alternator TA and a transformer T9 to vary their anode circuit currents. At such time as approach controlled relay VM is released closing back contact 20 current flows from battery terminal B through operating winding 16 of the alternator to terminal C and the alternator is energized to vibrate its reed armature 18. With armature 18 vibrating to alternately engage contacts 79 and 80, direct current impulses are alternately supplied to the two portions of primary winding 81 of transformer T9 due to the mid terminal of winding 81 being connected to battery terminal C through an adjustable resistor 83 and to ground through a high resistor 84. Thus an alternating voltage is induced in secondary winding 82 of transformer T9, the frequency of this alternating voltage being predetermined by the frequency of operation of the tuned alternator.

The voltage induced in secondary winding 82 of transformer T9 is applied to the control electrodes of tubes V8 and V9, one outside terminal of secondary winding 82 being connected to control electrode or grid 85 of tube V8, the other outside terminal of winding 82 being connected to control electrode 86 of tube V9 and mid terminal of winding 82 being connected to the filaments of the tubes through wire 87. It follows that the anode currents of the tubes V8 and V9 are varied by the alternating voltage applied to the control electrodes of the tubes and the alternating components of the anode currents cause an alternating voltage to be induced in secondary winding 88 of transformer T7, the frequency of this alternating voltage induced in winding 88 being predetermined by the operating frequency of the tuned alternator.

The secondary winding 88 of transformer T7 is coupled to the track circuit through track transformer T6, the connection being governed by power-off relay POR1. A resistor 89 is connected across winding 88 and primary winding 90 of a small transformer T10 is connected across a portion of resistor 89 while a secondary winding 91 of transformer T10 is connected to relay POR1 through a full wave rectifier 92. It follows that relay POR1 is energized in response to the voltage induced in winding 88. Normally, winding 88 is short circuited through a resistor 95 and back contact 96 of relay POR1 but with the relay picked up closing front contact 93, the winding 88 is connected to a primary winding 94 of track transformer T6, a capacitor 97 being preferably connected across winding 94. It is to be seen therefore that with an alternating voltage induced in winding 88 of transformer T7 as a result of rectifying and conversion of the commercial frequency current, an alternating current of a frequency predetermined by the operating frequency of the tuned alternator is supplied to the track circuit through the track transformer T6.

Power from the stand-by battery is converted into alternating current of the preselected frequency through contacts 98 and 99 of alternator TA and the track transformer T6. With relay VM released and alternator TA energized to vibrate armature 18 to alternately engage contacts 98 and 99 impulses of direct current are alternately fed to primary winding 100 of transformer T6, the connection being completed from mid terminal of winding 100 to terminal C of the battery through back contact 101 of relay POR1. Such impulses of direct current flowing in winding 100 induces an alternating voltage in secondary winding 69 of the track transformer, this alternating voltage causing current to flow in the rails and being of the same preselected frequency supplied through tubes V8 and V9 because both voltages are derived from the operating frequency of the tuned alternator.

With the track section D—E unoccupied the track relay TR is energized by current supplied from track battery 2, current from the BX—CX source is rectified and a direct current flows in the anode circuits of tubes V8 and V9. When a train occupies the section D—E to release relay VM, the tuned alternator is operated to vary the anode currents of tubes V8 and V9 and the power is converted into an alternating current of a preselected frequency predetermined by the operating frequency of the alternator. This alternating current of preselected frequency is applied to the power-off relay POR1 to pick up that relay and complete the connection by which the current is supplied to primary winding 97 of the track transformer T6 and in turn is supplied to the track circuit from secondary winding 60 of the track transformer. The current may be coded through a coder or code repeater relay. In the event a power failure occurs at the BX—CX source then energy from the stand-by battery is converted into alternating current of the preselected frequency through other contacts of the alternator and the track transformer, the connection being completed through a back contact of the power-off relay.

Apparatus here provided has the advantages that alternating current of a special frequency for track circuits is supplied from an alternating current of commercial frequency through means in which the interruption of the relatively high current is effected through vacuum tubes. A stand-by source of power is immediately made available in case of a loss of power of the commercial source of current. Also, the gas tubes when used are fully protected against ion bombardment of the cathode when power is reapplied subsequent to a temporary loss of power of the commercial source.

Although I have herein shown and described only three forms of track circuit apparatus embodying my invention, it is understood that various changes and modifications may be made therein with the scope of the appended claims without departing from the spirit and scope of my invention.

Having thus described my invention, what I claim is:

1. In combination with a track section, an alternating current power source, a direct current power source, said alternating current having a given frequency, a tuned alternator having an operating cycle of a preselected frequency and which frequency is different from said given frequency, converter means including a gas tube, means including a rectifier to connect said alternating current power source to an anode circuit of said tube to fire the tube but normally ineffective, means to connect an operating winding of said alternator to said direct current source to operate the alternator, circuit means including a contact of said alternator to connect said direct current source to a grid circuit of said tube each operating cycle of the alternator to condition the tube to be fired by said rectified current, means to deionize said tube, a transformer having a first winding interposed in said anode circuit to induce in a second winding of said transformer an alternating voltage of a frequency preselected according to the operating cycle of said alternator, a power-off relay connected to said second winding to be energized by such induced alternating voltage, means including a front contact of said relay to connect said second winding to said rails to supply thereto alternating current due to said alternating voltage, another transformer, means including a contact of said alternator and a back contact of said relay to connect said direct current power source to a first winding of said other transformer to induce in a second winding of said other transformer an alternating voltage of a frequency preselected according to the operating cycle of said alternator, and means including a back contact of said relay to connect said second winding of said other transformer to the rails to supply thereto alternating current due to said last mentioned induced alternating voltage.

2. In combination with a track circuit including the rails of a track section; a pair of gas tubes each having an anode, a cathode and a control grid, a power source of alternating current of a given frequency, a battery, a grid circuit for each of said tubes connected to the grid and cathode of the tube and to said battery to bias the grid negative in potential with respect to the cathode, an anode circuit for each of said tubes connected to the anode and cathode of the tube and to said power source of alternating current, a rectifier interposed in each of said anode circuits, said power source having a voltage sufficient to fire said tubes but normally ineffective due to said grid bias, a tuned alternator operable when energized to alternately close a first and a second contact at a preselected rate, traffic controlled means to at times connect said battery to said alternator for operation thereof, a first and a second transformer, said first transformer having a portion of its primary winding interposed in each of said anode circuits, means including said alternator contacts connected to said grid circuits to alternately remove the grid bias of said tubes to alternately fire the tubes, means connected to said anodes and cathodes of said tubes to alternately deionize the tubes, a relay connected to a secondary winding of said first transformer energized by the alternating current induced therein due to such alternate firing of the tubes, means including said alternator contacts to connect a primary winding of said second transformer to said battery to alternately supply current to different portions of such primary winding, and means including front and back contacts of said relay to selectively connect the secondary windings of said transformers to the rails of said section to supply to the rails alternating current as supplied either from said power source through said tubes or from said battery through said second transformer.

3. In combination with a track section provided with a track circuit including a secondary winding of a track transformer, a tuned alternator to operate at times a first and a second pair of contacts at a predetermined frequency, a pair of electron tubes, a power source of alternating current, a power source of direct current, an output transformer, means including a rectifier and a primary winding of said output transformer to connect said power source of alternating current to an anode and cathode of each of said tubes to form a pair of anode circuits in which a substantially constant value of current flows, a control transformer, means including said control transformer and said first pair of alternator contacts to connect said direct current source to a control electrode and cathode of each of said tubes to form a pair of control circuits to vary the currents of said anode circuits in step with the operating frequency of said alternator to induce in a secondary winding of said output transformer an alternating voltage of a preselected frequency, a power-off relay energized by such alternating voltage, means including a front contact of said relay to connect said secondary winding of the output transformer to a first primary winding of said track transformer to supply alternating current of said preselected frequency to the rails due to power derived from said power source of alternating current, and means including said second pair of alternator contacts and a back contact of said relay to connect said power source of direct current to a second primary winding of said track transformer to supply alternating current of said preselected frequency to the rails due to power derived from the power source of direct current.

4. In combination with a track section provided with a track circuit, a first and a second power source, a tuned alternator having an operating cycle of a definite frequency; an electron tube having an anode, a cathode and a control electrode; a first and a second transformer, means including a primary winding of said first transformer to connect said first power source to said anode and cathode of said tube, means to at times energize an operating winding of said alternator for operation thereof, control circuit means including an element controlled by said alternator each operating cycle thereof connected to said control electrode and cathode of said tube to vary the current flowing from said first power source in said primary winding of the first transformer to induce in a secondary winding of the first transformer an alternating voltage of a frequency determined by the operating cycle of the alternator, a relay energized by the voltage induced in said secondary winding of the first transformer, means including a front contact of said relay to couple said secondary winding of the first transformer to said track circuit to supply an alternating track circuit current due to energy supplied by said first power source, means including a back contact of said relay and an element controlled by said alternator each operating cycle thereof to connect said second power source to a primary winding of said second transformer to induce in a secondary winding of the second transformer an alternating voltage of a frequency determined by the operating cycle of the alternator, and means to couple said secondary winding of the second transformer to said track circuit to suply an alternating track circuit current due to energy supplied by said second power source.

CARL VOLZ.

REFERENCES CITED

The following references are of record in the file of this patent:

UNITED STATES PATENTS

| Number | Name | Date |
|---|---|---|
| 1,694,373 | Clark et al. | Dec. 11, 1928 |
| 1,893,223 | Burkle | Jan. 3, 1933 |
| 2,045,992 | Nicholson | June 30, 1936 |
| 2,088,490 | Slepian | July 27, 1937 |
| 2,098,040 | Hoppe | Nov. 2, 1937 |
| 2,098,401 | Prescott | Nov. 9, 1937 |
| 2,112,718 | Somers | Mar. 29, 1938 |
| 2,161,146 | Echlin et al. | June 6, 1939 |
| 2,172,271 | Ethy et al. | Sept. 5, 1939 |
| 2,277,459 | Seitz | Mar. 24, 1942 |
| 2,301,220 | Lowe | Nov. 10, 1942 |
| 2,337,207 | Nicholson | Dec. 21, 1943 |